United States Patent
Chan et al.

(10) Patent No.: US 8,730,911 B2
(45) Date of Patent: May 20, 2014

(54) SYSTEM AND METHOD FOR REDIRECTING MESSAGES TO AN ACTIVE INTERFACE OF A MULTIPLE-INTERFACE DEVICE

(75) Inventors: H. Anthony Chan, Plano, TX (US); Justin Zengjun Xiang, Vernon Hills, IL (US); James Han, Naperville, IL (US)

(73) Assignee: FutureWei Technologies, Inc., Plano, TX (US)

( * ) Notice: Subject to any disclaimer, the term of this patent is extended or adjusted under 35 U.S.C. 154(b) by 1017 days.

(21) Appl. No.: 12/757,807

(22) Filed: Apr. 9, 2010

(65) Prior Publication Data

US 2010/0284317 A1    Nov. 11, 2010

Related U.S. Application Data

(60) Provisional application No. 61/176,839, filed on May 8, 2009.

(51) Int. Cl.
*H04W 4/00*    (2009.01)

(52) U.S. Cl.
USPC .......................................................... 370/331

(58) Field of Classification Search
USPC ............................ 370/310–350; 455/436–444
See application file for complete search history.

(56) References Cited

U.S. PATENT DOCUMENTS

| | | | |
|---|---|---|---|
| 8,144,660 B2 | 3/2012 | Lee et al. | |
| 2007/0121549 A1* | 5/2007 | Yun et al. | 370/331 |
| 2007/0178876 A1* | 8/2007 | Yaqub et al. | 455/343.1 |
| 2007/0238452 A1 | 10/2007 | Haviala | |
| 2008/0101315 A1* | 5/2008 | Bachmutsky | 370/342 |
| 2010/0226298 A1 | 9/2010 | Chan et al. | |
| 2012/0057502 A1* | 3/2012 | O'Neill | 370/254 |
| 2012/0063428 A1 | 3/2012 | Ng et al. | |
| 2012/0238266 A1 | 9/2012 | Bachmann et al. | |
| 2012/0276904 A1 | 11/2012 | Bachmann et al. | |

FOREIGN PATENT DOCUMENTS

| | | |
|---|---|---|
| CN | 101237384 | 8/2008 |
| EP | 1764970 | 3/2007 |
| EP | 1841142 | 10/2007 |
| JP | 2009-509368 | 3/2009 |
| JP | 2009-531891 | 9/2009 |
| KR | 20080104655 A | 12/2008 |
| RU | 2273104 C2 | 10/2002 |
| WO | 03032604 A1 | 4/2003 |
| WO | WO 2007/110138 A1 | 10/2007 |
| WO | WO 2010/041440 A1 | 4/2010 |

OTHER PUBLICATIONS

Partial Translation of First Office Action of Chinese Application No. 201080006946.9, Mailing Date Feb. 28, 2013, 12 pages.

(Continued)

*Primary Examiner* — Andrew Chriss
*Assistant Examiner* — Kenan Cehic
(74) *Attorney, Agent, or Firm* — Slater & Matsil, L.L.P.

(57) ABSTRACT

In accordance with an embodiment, a method of operating a first network configured to communicate with a first interface of a multi-interface user device is disclosed. The first network receives a first message from the user device, where the first message requests that messages for the user device be forwarded via a second network. The first network receives a second message for user device and forwards the second message to the second network.

19 Claims, 6 Drawing Sheets

(56) References Cited

OTHER PUBLICATIONS

Notice of Reasons for Rejection for Japanese Patent Application No. 2012-502442, Mailing Date Feb. 5, 2013, 9 pages.
Office Action: Notification on Results of Estimation of Patentability of Invention, 2nd Category State IP Examiner of the Department of Computer Engineering, Translation, Gorodissky & Partners, Russian Application No. 2011141764/08(062510), Mailing Date Nov. 21, 2012, 8 pages.
Notice to Submit a Response to the Korean Intellectual Property Office, Korean Application No. 10-2011-7022212, Dated Jan. 14, 2013, 7 pages.
Official Action with English Translation received in Russian Application No. 2011141764, dated May 23, 2013; Applicant: Huawei Technologies Co., Ltd., CN., 5 pages.
Japanese Office Action with English Translation received in Japanese Patent Application No. 2012-502442 mailed Aug. 6, 2013, 5 pages.
"Technical Specification Group Services and System Aspects; Multi access PDN connectivity and IP flow mobility", Release 9, 3GPP TR 23.861 V1.1.1, Technical Report, 3rd Generation Partnership Project, (3GPP), Mobile Competence Centre, Apr. 2009, 47 pages.
European Communication, Application No. 10772042.7-2412, PCT/CN2010/072557, Huawei Technologies, Co., Ltd., European Search Report dated Feb. 6, 2012, 15 pages.
Tsao, Shiao-Li, "Benefits of multiple care-of addresses and home addresses for low power multimode mobiles", <draft-tsao-mip-multihoming-lowpower-00.txt>, National Chiao University, Oct. 2005, 7 pages.
Tsao, Shiao-Li et al., "Energy-Conserving Always-On Schemes for A Mobile Node With Multiple Interfaces in All-IP Network", The 18th Annual IEEE International Symposium on Personal, Indoor and Mobile Radio Communications (PIMRC '07), Sep. 1, 2007, 3 pages.
Montavont, N., et al., "MIPv6 for Multiple Interfaces", Internet Engineering Task Force, Internet Draft, <draft-montavont-mobileip-mmi-00.txt>, Feb. 2003, 10 pages.
PCT International Search Report and Written Opinion, PCT/CN2010/072557, Huawei Technologies, Co., Ltd., et al., dated Aug. 26, 2010, 12 pages.
"3rd Generation Partnership Project; Technical Specification Group Services and System Aspects; 3GPP System Architecture Evolution: Report on Technical Options and Conclusions (Release 8)," Technical Report, Sep. 2008, 3GPP TR 23.882 V8.0.0, Global System for Mobile Communications, 234 pages.
"Part 16: Air Interface for Fixed and Mobile Broadband Wireless Access Systems, Amendment 2: Physical and Medium Access Control Layers for Combined Fixed and Mobile Operation in Licensed Bands and Corrigendum 1," IEEE Standard for Local and metropolitan area networks, Feb. 28, 2006, 864 pages, IEEE Std 602.16e™—2005 and IEEE Std 802.16™—2004/Cor1—2005, (Amendment and Corrigendum to IEEE Std 802.16—2004), IEEE Computer Society and the IEEE Microwave Theory and Techniques Society, New York.
Part 11: Wireless LAN Medium Access Control (MAC) and Physical Layer (PHY) Specifications, IEEE Standard for Information technology—Telecommunications and information exchange between systems—Local and metropolitan area networks—Specific requirements, Jun. 12, 2007, 1233 pages, IEEE Std 802.11™-2007 (Revision of IEEE Std 802.11—1999), IEEE Computer Society, New York.
"Call forwarding," retreived from Wikipedia, Sep. 28, 2010, http://en.wikipedia.org/wiki/Call_forwarding, pp. 1-3.
"Handover," retreived from Wikipedia, Sep. 28, 2010, http://en.wikipedia.org/wiki/Handover, pp. 1-5.
Decision on Grant of A Patent for Invention with English translation received in Russian Patent ApplicationNo. 2011141764/08(062510) received Jan. 27, 2014, 15 pages.

\* cited by examiner

SYSTEM AND METHOD FOR REDIRECTING MESSAGES TO AN ACTIVE INTERFACE OF A MULTIPLE-INTERFACE DEVICE

CROSS REFERENCE TO RELATED APPLICATIONS

This patent application claims priority to U.S. Provisional Application No. 61/176,839 filed on May 8, 2009, entitled "Method to Re-direct Messages to an Active Interface of a Multiple Interface Device," which application is incorporated by reference herein in its entirety.

TECHNICAL FIELD

The present invention relates generally to communication systems, and more particularly to a system and method for redirecting messages to an active interface of a multiple-interface device.

BACKGROUND

Wireless communication systems are widely used to provide voice and data services for multiple users using a variety of access terminals such as cellular telephones, laptop computers and various multimedia devices. Such communication systems can encompass local area networks, such as IEEE 802.11 networks, cellular telephone and/or mobile broadband networks. The communication systems can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), IEEE 802.11 networks, Evolution-Data Optimized EV-DO, or Long Term Evolution (LTE).

Figure 1:
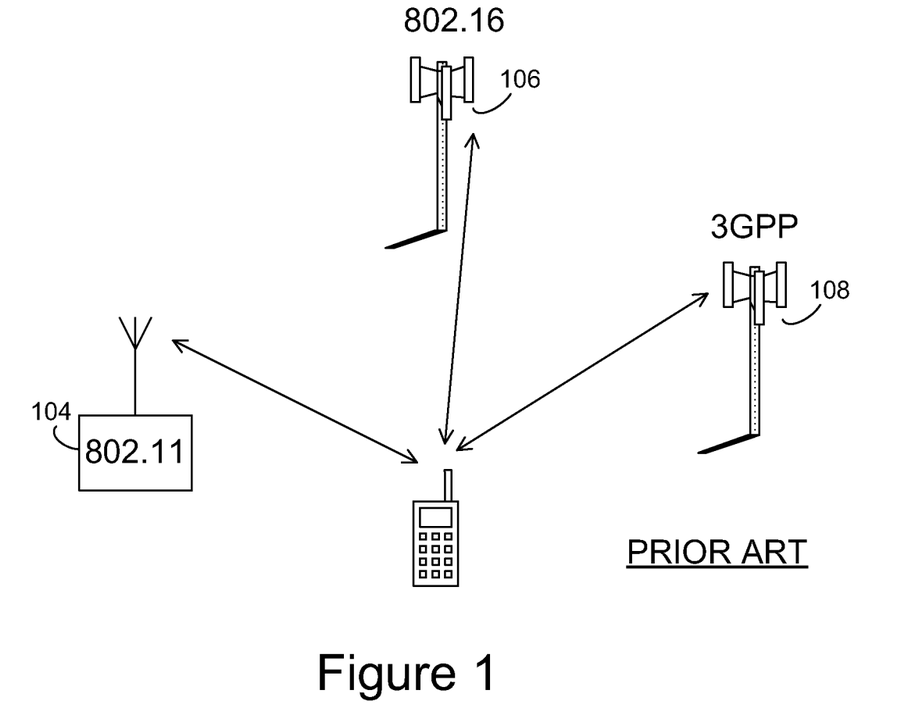
FIG. 1 illustrates a diagram of a mobile broadband system according to the prior art.

As wireless networks have become more pervasive, many user devices are now configured to access more than one wireless network. For example, as shown in FIG. 1, user device 102 is configured to access three networks, for example IEEE 802.11 network 104, IEEE 802.16 network 106, and 3GPP network 108. In such a multiple-interface device, each interface may involve other network technologies, such as, but are not limited to GSM, GPRS, LTE, WiMAX, CDMA2000, WLAN, etc. These individual wireless technologies may use different wireless access technologies that include but are not limited to TDMA, CDMA, or OFDMA.

When multiple interfaces in a user device share the same battery, and if power consumption is optimized only within each individual interface technology, the user device may consume more power than a user device having a single interface because all interfaces may be simultaneously active and/or periodically receive transmissions from each of their respective networks. In the field of wireless communications systems, what is needed are systems and methods that better utilize power consumption for multiple-interface devices.

SUMMARY OF THE INVENTION

In accordance with an embodiment, a method of operating a first network configured to communicate with a first interface of a multi-interface user device is disclosed. The first network receives a first message from the user device, where the first message requests that messages for the user device be forwarded via a second network. The first network receives a second message for user device and forwards the second message to the second network.

In accordance with another embodiment, a method of operating a first network configured to communicate with a first interface of a multi-interface user device is disclosed. The method includes receiving a forwarded message from a second network for the multi-interface user device and forwarding the message to the first interface of the multi-interface user device.

In accordance with another embodiment, a method of operating a user device comprising a first interface operating on a first network and a second interface operating on a second network includes shutting down the second interface. Shutting down the second interface includes the second interface transmitting a redirect request to the second network that requests the second network to forward messages to the first interface. The second interface is then placed in a state unreachable by the second network, and the first interface is placed in a state reachable by the first network.

In accordance with another embodiment, a wireless communication system includes a forwarding agent on the first network. The forwarding agent is configured to communicate with a first interface of a multi-interface user device and receive a first message from the user device, where the first message requests that messages for the user device be forwarded via a second network. The forwarding agent is also configured to receive a second message for the user device forward the second message to the second network.

In accordance with another embodiment, a wireless user device includes a first interface configured to communicate with a first network and a second interface configured to communicate with a second network. The wireless user device is configured to transmit a redirect request to the second network, where the redirect request requesting the second network to forward messages to the first interface, place the second interface in a state unreachable by the second network, and place the first interface in a state reachable by the first network.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in specific contexts, for example, a system and method for redirecting messages to an active interface of a multiple-interface device.

In embodiments, power conservation in a multiple-interface device is achieved by keeping at least one interface active while shutting off other interfaces of a multiple-interface device. A call connection request, or other request, addressed to a turned-off interface is redirected to an active interface. On receiving the connection request originally addressed to the turned-off interface, the active interface wakes up the turned-off interface to receive the message, or handles the call on behalf of the turned-off interface depending on the requirements of the application, the user preferences, or other criteria. The active interface may be any power state, for example, a sleep state or an idle state, in which it is able to receive a call request.

Descriptions of embodiment systems and methods that achieve power saving can be further found in U.S. patent application Ser. No. 12/714,278 filed on Feb. 26, 2010, entitled "System and Method of Power Management for a Device with Multiple Network Interfaces," U.S. Provisional Application No. 61/158,206 filed on Mar. 6, 2009, entitled "An Overlap Power Management for Device with Multiple Network Interfaces Each with Its Own Power Management," U.S. Provisional Application No. 61/177,171 filed on May 11, 2009, entitled "System and Method of Power Management for a Device with Multiple Network Interfaces," and U.S. Provisional Application No. 61/177,559 filed on May 12, 2009, entitled "Centralized Power Management for Device with Multiple Network Interfaces," all of which applications are incorporated by reference herein in their entirety.

In one embodiment of the invention, a method to redirect the connection request to an active interface is analogous to, but is separate from, the mobile IP technology. This redirection of connection request is independent of mobile IP technology so that it can be used in conjunction with mobile IP. Methods of redirecting the connection request and canceling the redirection afterwards with or without mobile IP are described herein.

Figure 2:
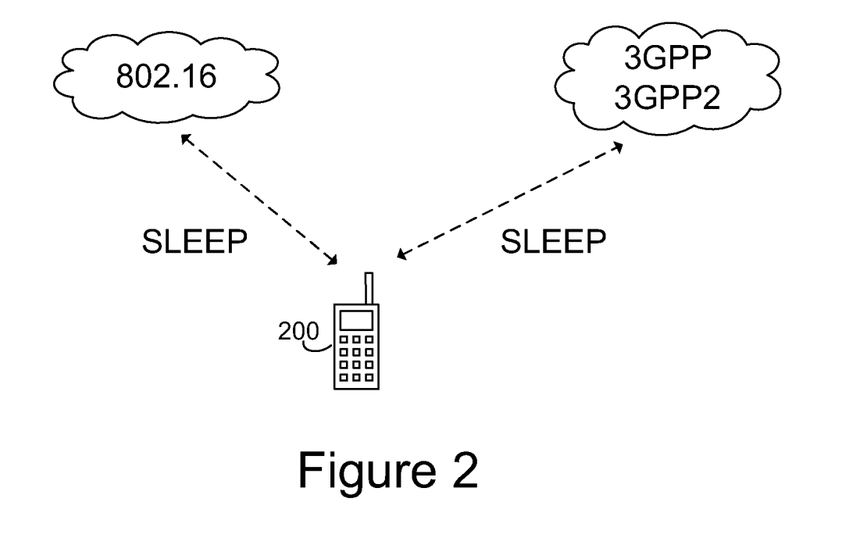
FIG. 2 illustrates an embodiment multiple interface user device.

FIG. 2 illustrates a conventional configuration in which device 200 has two interfaces. One interface is coupled to an IEEE 802.16 network and the other interface is coupled to a 3GPP or 3GPP2 network. When the phone is not being actively used, both interfaces are in a sleep mode or another power saving mode in which the phone interfaces can receive periodic messages from their respective networks. For example, in sleep mode, the phone periodically turns on its receiver, or maintains its receiver in a powered up state so that it can receive transmissions from the respective networks. When both interfaces of user device 200 are in such modes, however, the battery may drain faster than a battery supplying a phone with a single interface in sleep mode.

Figure 3:
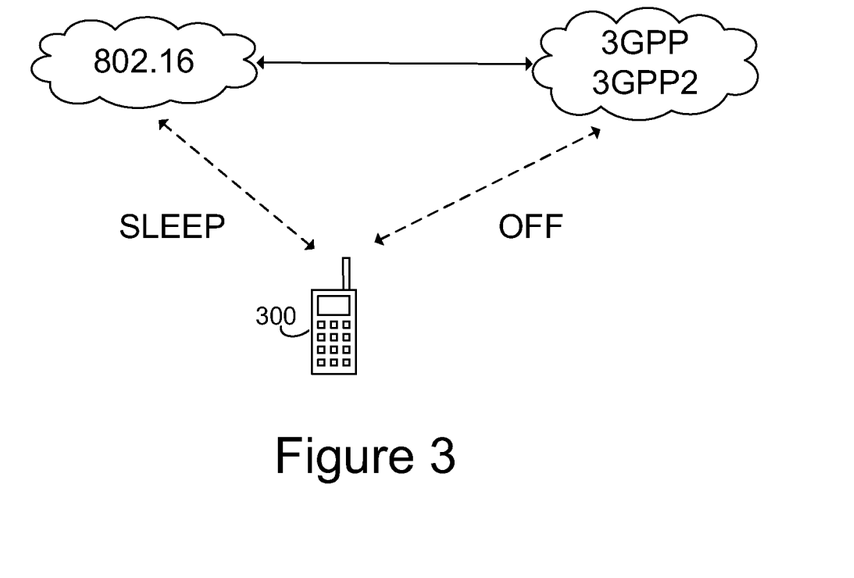
FIG. 3 illustrates a diagram of an embodiment multiple interface user device.

In one embodiment of the present invention, a power management system for a multiple interface device shuts off some interfaces that are not in active use and redirects call connection requests, or other requests and messages, which are destined for an "off" interface to an active interface so that the device may continue signal handshake for multiple interfaces. FIG. 3 illustrates embodiment user device 300 in which one interface is turned off and connection requests to the "off" interface are redirected to the "sleep" mode interface through the network. In some embodiments, user device 300 may appear to another device as a correspondent node (CN) that is attempting to establish a connection with the device through the turned-off interface as though the off-interface is in the "sleep" state. In some embodiments, user device 300 having one interface in the "sleep" mode and at least one other interface that is turned "off," behaves as user device 200 in FIG. 2 in that both networks, for example the 802.16 network and the 3GPP or 3GPP2 network, are able to send messages to user device 300. The power consumption of user device 300, however, is lower than that of user device 200 because one of the interfaces is shut "off" instead of being in a "sleep" mode.

Embodiments of this invention include keeping one or at least one interface active. The active interface may be any power state, such as sleep or idle state, for which it is able to receive a connection request.

Figure 4:
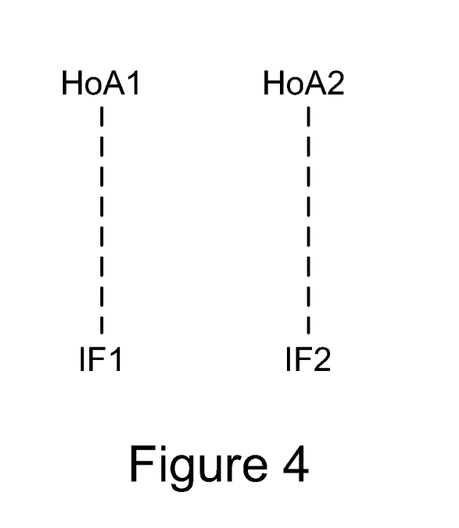
FIGS. 4-7 illustrate connection diagrams for an embodiment multiple interface user devices.

The multiple interfaces may establish different network connections with different IP addresses. An example of an embodiment configuration is shown in FIG. 4 with two interfaces IF1 and IF2, with IP addresses HoA1 and HoA2, respectively, which correspond to the network connections shown for user device 200 in FIG. 2. Before interface IF2 is turned off, user device 200 sends a message to its network to redirect its incoming messages to the address HoA1.

In order to make user device 300 in FIG. 3 able to respond to messaged from both the 802.16 network and the 3GPP or 3GPP2 network, even when the interface to the 3GPP or 3GPP2 network is shut off, some embodiments use a forwarding mechanism. In some embodiments, the forwarding mechanism uses existing and available forwarding mechanisms, for example, forwarding mechanisms used in mobility technology.

Figure 5:
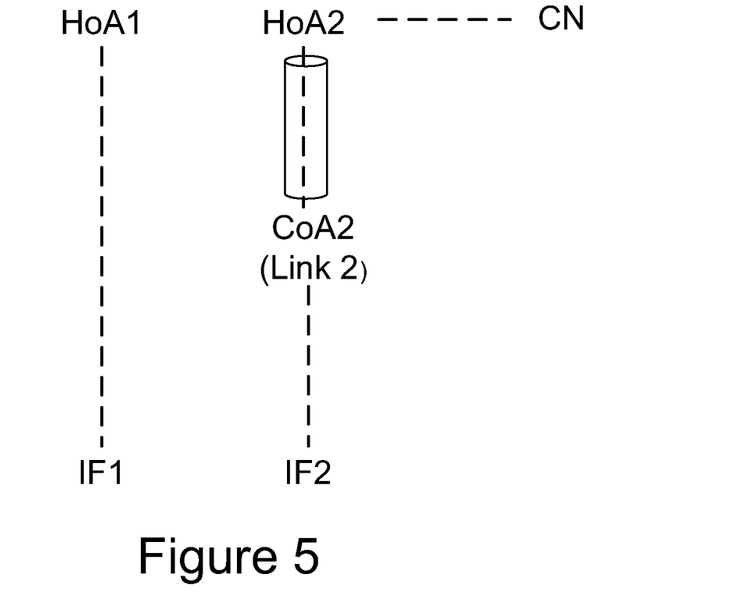

In some embodiments, Mobile IP technology is used as a forwarding mechanism, as illustrated in FIG. 5. In an embodiment, user device (See FIG. 3) acquires a connection link that receives packet with the address CoA2 when it has moved to a visited network such that there is a binding between HoA2 and CoA2. Traffic destined to address HoA2 is intercepted by the home agent (HA) or local mobility anchor (LMA) in the home network of IF2 and is forwarded to CoA2 using IP-in-IP tunneling. That is, the IP packet addressed to HoA2 is encapsulated inside an outer IP header with CoA2 as the destination address. Embodiments of this invention use a similar forwarding mechanism so that the connection request originally destined to IF2 is forwarded to IF1.

In one embodiment, a mechanism of turning off IF2 and forwarding its messages to IF1 is separate from a Mobile IP mechanism. In this embodiment, this mechanism and Mobile IP do not interfere with each other so that the system can continue to use Mobile IP in different variants including Proxy Mobile IP (PMIP) for mobility. Embodiments of this invention therefore include a method in which IF1 can be either in its home network or in a visited network. In addition, IF2 can also be either in its home network or in a visited network.

Figure 6:
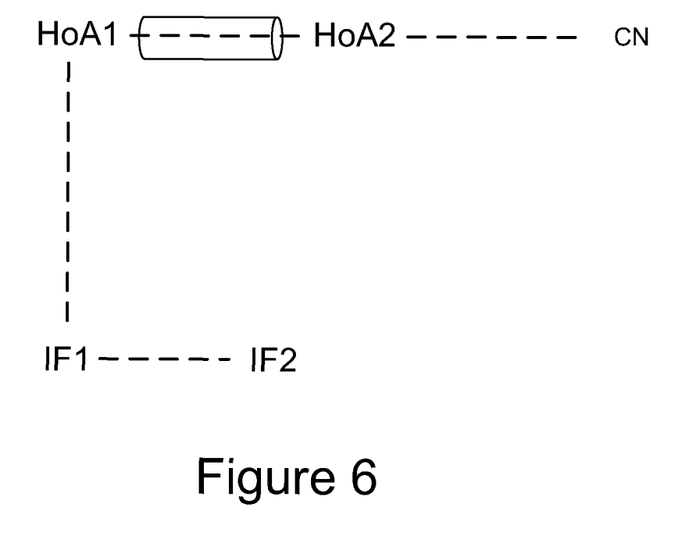

FIG. 6 shows one embodiment of this invention in which IF1 is in its home network. When turning IF2 off, a binding is set up between HoA2 and HoA1 to forward the HoA2's messages to HoA1, which, in some embodiments, is similar to the binding between HoA2 and CoA2 in IP mobility in FIG. 5. Before turning IF2 off, IF2 makes a binding request to the home agent (HA) or local mobility anchor (LMA) in its home network. The connection request destined to HoA2 is then intercepted by HA or LMA, which then tunnels this connection request to the address HoA1. This IP-in-IP packet has a destination address of HoA1. The connection request will, therefore, go to IF1 through the network serving IF1.

In an embodiment, if the active interface IF1 is in sleep mode, the connection request to IF2 forwarded to the network serving IF1 will cause the network to wake up IF1 to receive the message. When the device opens the IP-in-IP outer header of the received message, the device will find that the packet contains a connection request to IF2. The device then decides whether to handle the call using IF1 on behalf of IF2, or wake up IF2 to receive the call using IF2. In an embodiment, the decision depends on application requirements, capabilities of the interfaces, user preference, power consumption consideration, or other criteria.

In one embodiment example, IF1 is 3GPP LTE interface and IF2 is WiFi interface. An incoming invitation to connect is sent to HoA2. In an embodiment, the invitation is for a VoIP session and the needed bit rate for VoIP is quite low so that either interface may handle the call. If the user has a user plan that has unlimited access to the WiFi network but the access to the LTE network is charged according to the data volume, the device acting according to user preference may wake up IF2 to handle the call. On the other hand, if the device at that time is in a location where no WiFi service is available, the device may handle the call using IF1. If the device decides to wake up IF2 to reply to the connection request, the device will wake up IF2 to connect to the network.

Figure 7:
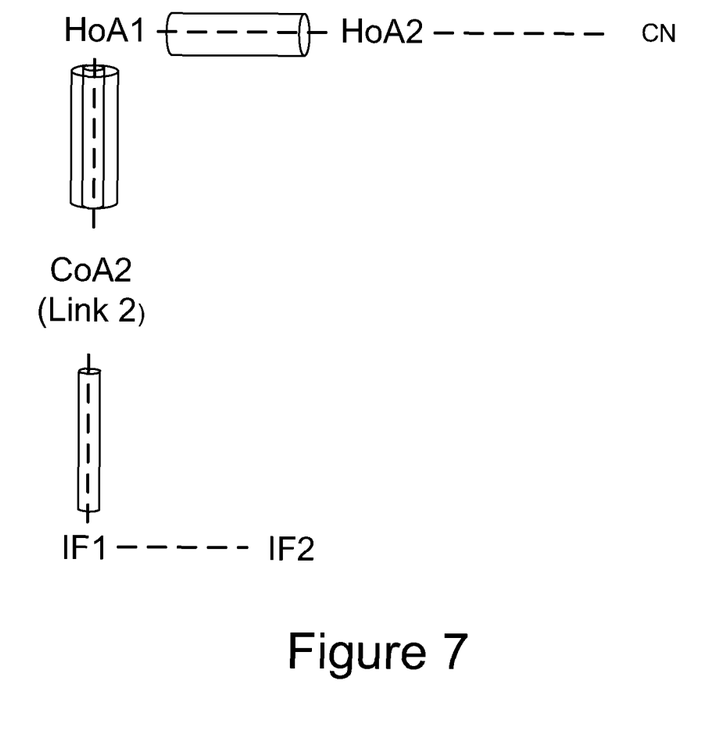

In another embodiment, when IF1 is in a visited network while IF2 is turned off. A message to HoA2 is intercepted by the HA or LMA in the home network of IF2, and the message is tunneled with HoA1 as the destination address in the outer header. In some embodiments, this encapsulated packet behaves as any other (non-encapsulated) packet addressed to HoA1. If IF1 is in a visited network, there is a mobile IP (MIP) binding between HoA1 and CoA1. The HA or LMA in the home network of IF1 then intercepts the already encapsulated packet in a similar manner as it intercepts a non-encapsulated packet addressed to HoA1. The HA or LMA then tunnels the already tunneled packet to the address CoA1. That is, in an embodiment, the already encapsulated packet is encapsulated again with the destination address CoA1 in the outermost header. Following the mobile IP mechanism, this IP-in-IP-in-IP packet will reach the foreign agent in IF1's visited network. The foreign agent will de-encapsulate the outermost header and deliver the packet to IF1 according to the destination address HoA1. IF1 will de-encapsulate this packet again to find out that the packet belongs to IF2. FIG. 7 illustrates a connection diagram describing this embodiment.

In an embodiment, IF2 can be either in its home network or in a visited network when being waked up. When IF2 is waked up, a binding update is sent to the home network of IF2 so that the HA or LMA in the home network of IF2 will not forward the messages to IF1.

In an embodiment for which IF2 is in its home network when being waked up, binding update is sent to the HA or LMA in the home network of IF2 so that the messages destined to HoA2 will reach IF2 according to the configuration of IF2 shown in FIG. 4.

In another embodiment, IF2 is in a visited network when being waked up, and a binding update is sent to the HA or LMA in the home network of IF2 so that messages destined to HoA2 will reach IF2 using mobile IP tunneling according to the configuration of IF2 shown in FIG. 5.

Figure 8:
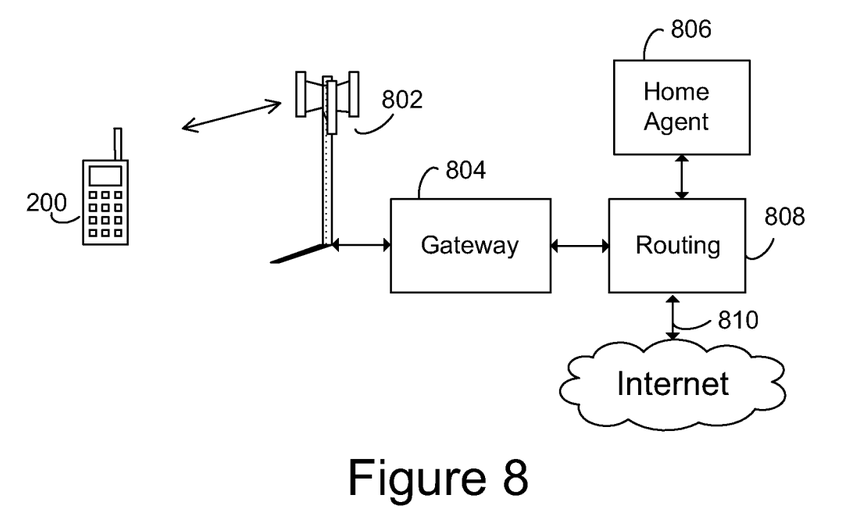
FIG. 8 illustrates a block diagram of an embodiment network.

FIG. 8 illustrates an embodiment network diagram showing user device 200 in communication with base station 802. Base station 802 is coupled to gateway 804, which is, in turn coupled to routing function 808. Router or routing function 808 is in communication with home agent (HA) 806 and Internet connection 810. In embodiments of the present invention, gateway 804, HA 806 and routing function 808 are implemented with conventionally known network hardware including, but not limited to servers and switches having computer processors and memory.

In an embodiment IP network, HA 806 is a logical function to the IP network similar to how an authentication, authorization and accounting (AAA) server is a function to the IP network. In one embodiment, HA 806 is coupled to or a part of router 808 in the home network. In an embodiment, HA 806 is higher up the network hierarchy than the base station and is located in the network hierarchy such that packets sent to the home address will be intercepted by the HA 806. In an embodiment, HA 806 has database function to keep the location information of the mobile node. In an embodiment WiMAX network, for example, the location of home agent (HA) is within the network access provider network (NAP). In alternative embodiments, HA 806 is located in a different portion of the network.

In an embodiment, a user device has two distinct IP addresses and is adapted to connect to a network having a call redirect mechanism to redirect incoming call from one interface to another interface. In an embodiment, the call forwarding mechanism is Mobile IP, however, in alternative embodiments, a different call forwarding mechanism can be used. In an embodiment using Mobile IP, the user device has a home address (HoA) as a permanent address, which is configured in its home network. When the device moves to a different (visited) network, it takes a care-of-address (CoA). In an embodiment, the visited network informs the home agent about the CoA, such that an incoming message has the HoA as the destination address. The incoming message is intercepted by a home agent in the home network. The home agent then forwards the packet to CoA so that it will reach the user device. In an embodiment, such forwarding is achieved by encapsulating the packet with an outer IP header with CoA as destination address.

Figure 9:
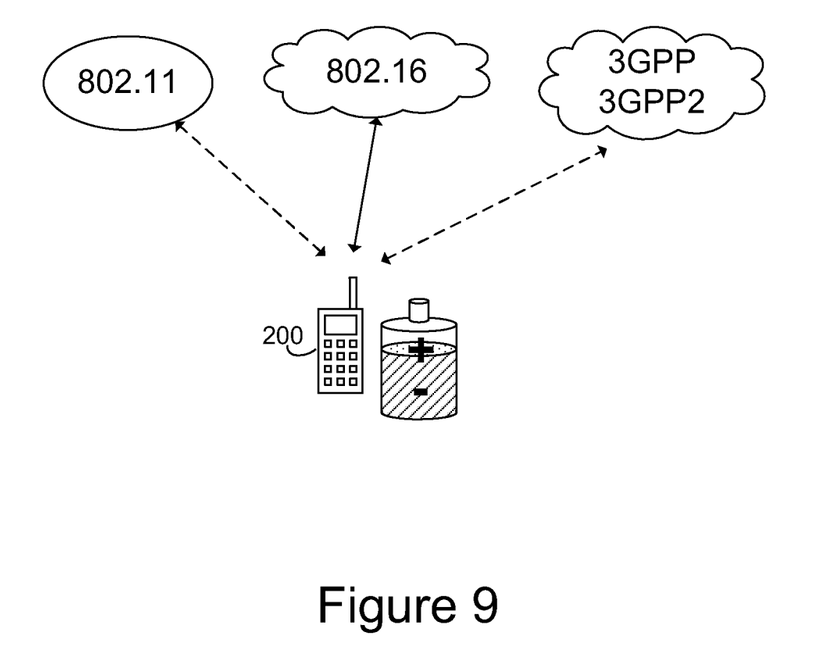
FIG. 9 illustrates an embodiment multiple-interface user device.

Various embodiments can be implemented in a number of contexts. In a multiple-interfaces device, each interface may involve different network technologies such as, but not limited to, GSM, GPRS, LTE, WiMAX, CDMA2000, WLAN, and others. These individual wireless technologies may use different wireless access technologies that include, but are not limited to, TDMA, CDMA, or OFDMA. In one example, FIG. 9 shows a multiple-interface device with a network access for each interface. For each interface, in order that it may be active when needed, it maintains attachment to the network whether or not it is being actively used. When an interface is not in active use, its attachment to the network is maintained with hand-shaking signaling in an embodiment. While the interface is usually in a state of lower power consumption (such as but is not limited to being in sleep mode or in power saving mode), it continues to consume power in order to maintain its network attachment.

Figure 10:
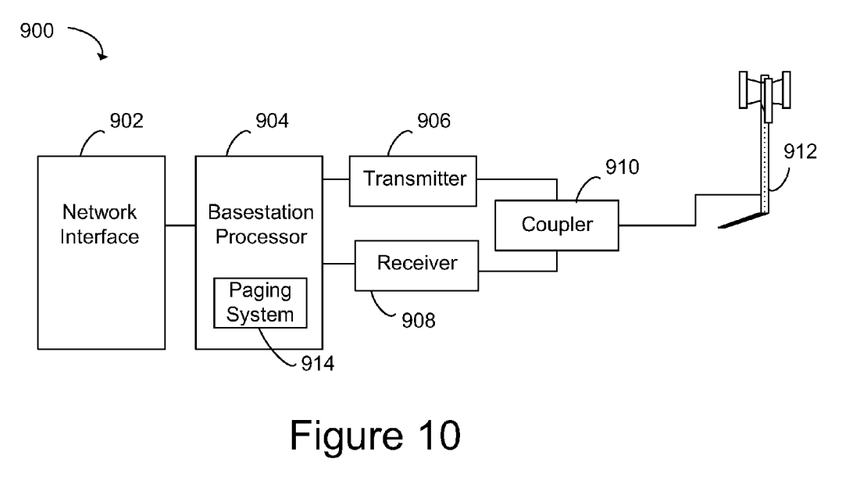
FIG. 10 illustrates an embodiment base station.

In an embodiment, portions of embodiment algorithms are implemented in wireless base station 900, as shown in FIG. 10. Base station 900 has a base station processor 904 coupled to transmitter 906 and receiver 908, and network interface 902. Transmitter 906 and receiver 908 are coupled to antenna 912 via coupler 910. In embodiments of the present invention, base station 900 may operate, for example, in a LTE network using an OFDMA downlink channel, in an IEEE 802.11 network, IEEE 802.16 network, or in a 3GPP network, as examples. In alternative embodiments, other systems, network types and transmission schemes can be used, for example, Wimax, and/or 1XEV-DO.

In embodiments of the present invention, base station processor 904 processes messages transmitted and received from user device with respect to interface states. In one example, base station processor 904 implements embodiment algorithms within paging system 914 or via a separate reachability control system. In alterative embodiments, paging system 914 and/or the reachability control system can be implemented using separate hardware and or processing devices. In further embodiments, embodiment algorithms are shared and/or distributed among processors in different networks, or by a dedicated remote processor reachable by a wireline or wireless network, or via the Internet.

Figure 11:
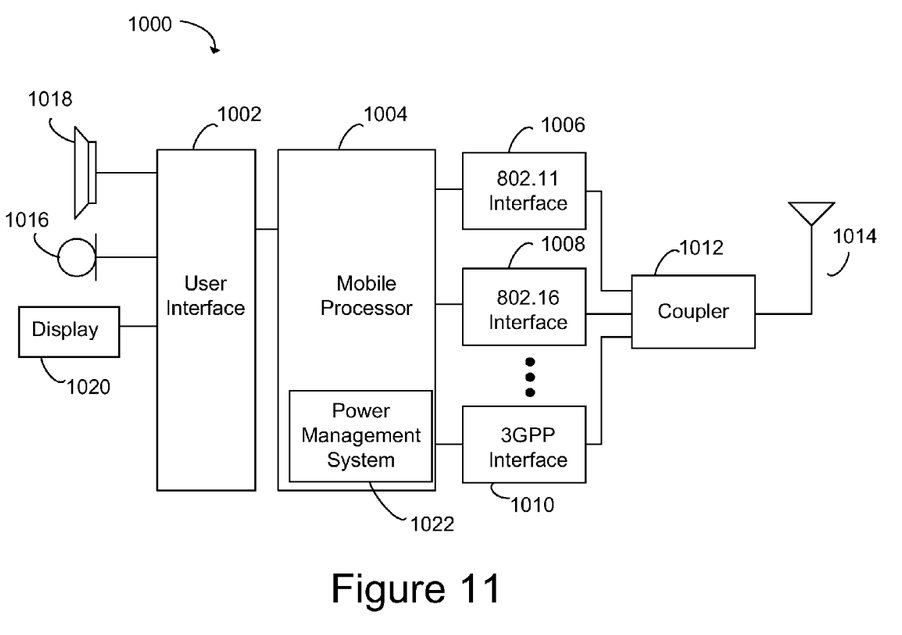
FIG. 11 illustrates an embodiment user device.

A block diagram of an embodiment multiple-interface user device 1000 is illustrated in FIG. 11. User device 1000 can be implemented, for example, as a cellular telephone, or other mobile communication device, such as a computer or network enabled peripheral. Alternatively, user device 1000 can be a non-mobile device, such as a desktop computer with wireless network connectivity. User device 1000 has mobile processor 1204, IEEE 802.11 interface 1206, IEEE 802.16 interface 1208 and 3GPP interface 1210. Each of these interfaces includes a transmitter and a receiver. In alternative embodiments, different combinations of greater or fewer interfaces can also be used. The output of each interface 1006, 1008 and 1010 are coupled to antenna 1014 via coupler 1012. Alternatively, some of the interfaces may be coupled to their own individual antennas. In further embodiments, one of more of these interfaces may comprise a wired interface such as a LAN connection, a Fast Ethernet connection, a wired WAN connection, Internet, or other interface.

User interface 1002 is coupled to mobile processor 1004 and provides interfaces to loudspeaker 1018, microphone 1016 and display 1020, for example. Alternatively, user device 1000 may have a different configuration with respect to user interface 1002, or user interface 1002 may be omitted entirely.

In an embodiment, mobile processor 1004 implements a power management system 1022 that controls the power states of interfaces 1006, 1008 and 1010 according to embodiments described herein. Alternatively, power management system 1022 can be implemented using a separate circuit and/or processor.

Embodiments of the present invention may include a number of features including but not limited to a method to forward messages to an active (including in sleep mode) interface while turning off other interfaces; a method for an active interface to receive message destined to an off interface and to wake up the off interface to receive the message; a method to encapsulate connection request messages to an off interface using IP-in-IP tunneling to send to an active interface; a method to encapsulate connection request messages to an off interface using IP-in-IP tunneling to send to an active interface, operating independent of and in conjunction with mobile IP technology or its variants including PMIP; a method to deactivate forwarding of messages for an off interface to an active interface; and a method to deactivate forwarding of messages for an off interface to an active interface operating independent of and in conjunction with mobile IP technology or its variants including PMIP.

Various embodiments can be used in a number of applications such as core network functions in 3GPP, WiMAX, 3GPP2, and WLAN products. Embodiment configurations also include mobile stations involving at least two interfaces of 3GPP, WiMAX, 3GPP2, WLAN or other system. In embodiments, mobile stations may achieve long battery life even when using multiple interfaces configured to operate with different, independent networks. In some embodiments, the different interfaces have their own individual power management states.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a first access network configured to communicate with a user device, the method comprising:

receiving, by a network device in the first access network, a re-direct message from the user device, wherein the user device comprises a first interface configured to communicate via the first access network and a second interface configured to communicate via a second access network, and wherein the re-direct message requests that messages addressed to the first interface be re-routed over the second access network;

binding a first home address of the user device to a second home address of the user device to establish an internet protocol (IP) to IP (IP-to-IP) tunnel for rerouting messages over the second access network, wherein the first home address is assigned to the first interface in the first access network, and wherein the second home address is assigned to the second interface in the second access network;

receiving, by the network device, a second message addressed to the first interface of the for user device; and forwarding, by the network device, the second message to the user device over the IP-to-IP tunnel, thereby rerouting the second message over the second access network.

2. The method of claim 1, wherein the network device is a Home Agent coupled to a router of the first access network.

3. A forwarding agent in a first access network, the forwarding agent comprising a processor configured to:
- communicate with a multi-interface user device, the multi-interface user device comprising a first interface configured to communicate via the first access network and a second interface configured to communicate via a second access network;
- receive a re-direct message from the multi-interface user device, the re-direct message requesting that messages addressed to the first interface be re-routed over the second access network,
- bind a first home address of the multi-interface user device to a second home address of the multi-interface user device to establish an internet protocol (IP) to IP (IP-to-IP) tunnel for rerouting messages over the second access network, wherein the first home address is assigned to the first interface in the first access network, and wherein the second home address is assigned to the second interface in the second access network;
- receive a second message addressed to the first interface of the multi-interface user device; and
- forward the second message to the multi-interface user device over the IP-to-IP tunnel, thereby rerouting the second message over the second access network.

4. The forwarding agent of claim 3, wherein the processor is further configured to process the first message and the second message.

5. The forwarding agent of claim 3, wherein the forwarding agent is configured to establish a communication link with the second access network.

6. The forwarding agent of claim 3, wherein the processor is further coupled to a router of the first access network.

7. The forwarding agent of claim 3, wherein the processor is configured to communicate with the multi-interface user device via a first base station in the first access network.

8. The forwarding agent of claim 3, wherein the processor is further configured to:
- receive a traffic flow from a core network of the multi-interface user device, the traffic flow comprising a plurality of data packets addressed to the first interface of the multi-interface user device;
- encapsulate the plurality of data packets with an outer IP header to obtain encapsulated data packets addressed to the second interface; and
- forward the encapsulated data packets over the IP-to-IP tunnel to the second interface of the multi-interface user device, thereby re-directing the traffic flow over the second access network to avoid activating the first interface of the multi-interface user device.

9. The forwarding agent of claim 3, wherein the IP-to-IP tunnel extends through the second access network without extending through a core network of the user device.

10. The method of claim 1, further comprising:
- receiving, by the network device, a traffic flow from a core network of the user device, the traffic flow comprising a plurality of data packets addressed to the first interface of the user device;
- encapsulating, by the network device, the plurality of data packets with an outer IP header to obtain encapsulated data packets addressed to the second interface; and
- forwarding, by the network device, the encapsulated data packets over the IP-to-IP tunnel to the second interface of the user device, thereby re-directing the traffic flow over the second access network to avoid activating the first interface of the user device.

11. The method of claim 1, wherein the IP-to-IP tunnel extends through the second access network without extending through a core network of the user device.

12. A non-transitory computer readable storage medium storing a computer program for execution by a processor, the computer program including instructions to:
- receive a re-direct message from a user device, wherein the user device comprises a first interface configured to communicate via the first access network and a second interface configured to communicate via a second access network, and wherein the re-direct message requests that messages addressed to the first interface be re-routed over the second access network;
- bind a first home address of the user device to a second home address of the user device to establish an internet protocol (IP) to IP (IP-to-IP) tunnel for rerouting messages over the second access network, wherein the first home address is assigned to the first interface in the first access network, and wherein the second home address is assigned to the second interface in the second access network;
- receive a second message addressed to the first interface of the user device; and
- forward the second message to the user device over the IP-to-IP tunnel, thereby rerouting the second message over the second access network.

13. The computer readable storage medium of claim 12, wherein the network device is a Home Agent coupled to a router of the first access network.

14. The computer readable storage medium of claim 12, wherein the IP-to-IP tunnel extends through the second access network without extending through a core network of the user device.

15. The computer readable storage medium of claim 12, wherein the computer program further includes instructions to:
- receive a traffic flow from a core network of the user device, the traffic flow comprising a plurality of data packets addressed to the first interface of the user device;
- encapsulate the plurality of data packets with an outer IP header to obtain encapsulated data packets addressed to the second interface; and
- forward the encapsulated data packets over the IP-to-IP tunnel to the second interface of the user device, thereby re-directing the traffic flow over the second access network to avoid activating the first interface of the user device.

16. A network device in a first access network, the network device comprising:
- a processor; and
- a non-transitory computer readable storage medium storing a computer program for execution by the processor, the computer program including instructions to:
  - receive a re-direct message from a user device, wherein the user device comprises a first interface configured to communicate via the first access network and a second interface configured to communicate via a second access network, and wherein the re-direct message requests that messages addressed to the first interface be re-routed over the second access network;
  - bind a first home address of the user device to a second home address of the user device to establish an internet protocol (IP) to IP (IP-to-IP) tunnel for rerouting messages over the second access network, wherein the first home address is assigned to the first interface in the first access network, and wherein the second home address is assigned to the second interface in the second access network;

receive a second message addressed to the first interface of the user device; and forward the second message to the user device over the IP-to-IP tunnel, thereby rerouting the second message over the second access network.

17. The network device of claim 16, wherein the network device is a Home Agent coupled to a router of the first access network.

18. The network device of claim 16, wherein the computer program further includes instructions to:

receive a traffic flow from a core network of the user device, the traffic flow comprising a plurality of data packets addressed to the first interface of the user device;

encapsulate the plurality of data packets with an outer IP header to obtain encapsulated data packets addressed to the second interface; and forward the encapsulated data packets over the IP-to-IP tunnel to the second interface of the user device, thereby re-directing the traffic flow over the second access network to avoid activating the first interface of the user device.

19. The network device of claim 16, wherein the IP-to-IP tunnel extends through the second access network without extending through a core network of the user device.

* * * * *